(12) United States Patent
Wolff et al.

(10) Patent No.: US 11,296,336 B2
(45) Date of Patent: Apr. 5, 2022

(54) WATER SEPARATOR FOR A FUEL CELL SYSTEM

(71) Applicant: Airbus Operations GmbH, Hamburg (DE)

(72) Inventors: Christian Wolff, Hamburg (DE); Jens-Dietrich Kurre, Hamburg (DE)

(73) Assignee: Airbus Operations GmbH

( * ) Notice: Subject to any disclaimer, the term of this patent is extended or adjusted under 35 U.S.C. 154(b) by 95 days.

(21) Appl. No.: 16/811,045

(22) Filed: Mar. 6, 2020

(65) Prior Publication Data

US 2020/0313208 A1  Oct. 1, 2020

(30) Foreign Application Priority Data

Mar. 28, 2019  (DE) .................... 10 2019 108 088.6

(51) Int. Cl.
*H01M 8/04* (2016.01)
*H01M 8/04119* (2016.01)

(52) U.S. Cl.
CPC .... *H01M 8/04164* (2013.01); *H01M 2250/20* (2013.01)

(58) Field of Classification Search
CPC ...................... H01M 8/04164; H01M 2250/20
USPC ........................................................ 429/414
See application file for complete search history.

(56) References Cited

U.S. PATENT DOCUMENTS

| 2006/0086074 A1 | 4/2006 | Kasuya et al. |
| 2009/0023019 A1 | 1/2009 | Koenekamp et al. |
| 2011/0195344 A1 | 8/2011 | Goebel et al. |
| 2013/0252118 A1 | 9/2013 | Otto |
| 2015/0107198 A1* | 4/2015 | Yamaura .................... F01N 3/02 55/385.3 |
| 2016/0126568 A1 | 5/2016 | Yamaura |
| 2018/0301722 A1 | 10/2018 | Kozuka |
| 2018/0323451 A1* | 11/2018 | Son .......................... B60L 50/72 |
| 2018/0375122 A1* | 12/2018 | Okamura ................ B01D 45/08 |
| 2019/0006685 A1* | 1/2019 | Maier ................ H01M 8/04014 |
| 2019/0157695 A1* | 5/2019 | Okamura .......... H01M 8/04037 |
| 2019/0282942 A1* | 9/2019 | Mishima ............ B01D 35/0273 |

FOREIGN PATENT DOCUMENTS

| DE | 102008033472 A1 | 2/2009 |
| DE | 102011009988 A1 | 8/2011 |
| DE | 102010052839 A1 | 5/2012 |
| DE | 102011114718 A1 | 4/2013 |

(Continued)

OTHER PUBLICATIONS

Extended European Search Report including Written Opinion for Application No. EP20163694.1, dated Jul. 30, 2020, pp. 1-8. (accompanied by machine generated translation).

(Continued)

*Primary Examiner* — James M Erwin
(74) *Attorney, Agent, or Firm* — Lerner, David, Littenberg, Krumholz & Mentlik, LLP

(57) ABSTRACT

A water separator for a fuel cell system includes a closed housing with a gas connection, and a base plate arranged remotely from the gas connection and having a drainage outlet, an inside width of the housing at least in portions decreasing from the base plate towards the gas connection, and the height of the housing being less than the greatest inside width of the housing.

20 Claims, 3 Drawing Sheets

(56) References Cited

FOREIGN PATENT DOCUMENTS

| | | |
|---|---|---|
| DE | 102015118418 A1 | 5/2016 |
| DE | 102018108777 A1 | 10/2018 |
| JP | 2002089787 A | 3/2002 |
| JP | 2009123517 A | 6/2009 |

OTHER PUBLICATIONS

German Search Report for Application No. 102019108088.6, dated Jan. 9, 2020, pp. 1-6. (accompanied by machine generated translation).

* cited by examiner

WATER SEPARATOR FOR A FUEL CELL SYSTEM

FIELD OF THE INVENTION

The invention relates to a water separator for a fuel cell system, a fuel cell system having such a water separator and a vehicle having a fuel cell system and such a water separator.

BACKGROUND OF THE INVENTION

In the operation of fuel cells water in the form of water vapour always accumulates as by-product. For reasons of weight and economic efficiency it is advisable, particularly when using a fuel cell in an aircraft, to separate the water and deliver it to other consumer units. Elongated, substantially cylindrical, canister-shaped water separators are known, which have a fluid connection to an exhaust or recirculation line of a fuel cell. Due to a relatively high pressure level of a gas-water vapour mixture flowing in the exhaust or recirculation line, this mixture may be supersaturated, so that water readily "falls" into the water separator. Failing this, the exhaust or recirculation line can be cooled, so that water vapour condenses out. It thereby continually accumulates and can be periodically removed from the water separator again, for example via a drainage outlet. For this purpose, a filling level sensor may be used, which detects when a set maximum filling level has been reached and initiates the opening of a drainage outlet. At the same time, it should be ensured that a residual quantity of water always remains, so that the gas-water vapour mixture cannot escape out of the drainage outlet. For this reason, a specific overall height is advisable.

DE102010052839A1 discloses a fuel cell system for generating electrical energy and water for use on board an aircraft, in which a water tank is supplied with water from a water separator coupled to the fuel cell system.

BRIEF SUMMARY OF THE INVENTION

In realizing efficient fuel cells in aircraft, larger quantities of water accumulate, which have to be drained off. At the same time, however, the overall space is not unlimited, so that there is not a corresponding overall height available, particularly for canister-like water separators affording sufficient capacity.

An aspect of the invention, therefore, relates to a water separator for a fuel cell system which has the smallest possible overall height but nevertheless affords a sufficient volume. It should be ensured that not all the water escapes from the water separator, leading to the unwanted escape of the gas containing water vapour.

A water separator for a fuel cell system is proposed, comprising a closed housing with a gas connection, and a base plate arranged remotely from the gas connection and having a drainage outlet, an inside width of the housing at least in portions decreasing from the base plate towards the gas connection, and the height of the housing being less than the greatest inside width of the housing.

The inside width of the housing may decrease in at least one portion, or alternatively also continuously. Here the water separator may also conform to the geometry of the installation space ("conformal tank"). The inside width may feasibly decrease by at least a quarter. It is furthermore feasible for the height of the housing to correspond to as much as half the maximum inside width.

The water separator according to an embodiment of the invention is consequently endowed with a significantly flatter design shape than the usual water separators previously described, of a largely canister-shaped formation. Owing to the relatively large inside width compared to the overall height, this consequently results in a water separator of a very shallow construction, the housing volume of which extends from the base plate towards the gas connection and furthermore tapers in this direction. The degree of taper causes the rate at which the level rises to increase as the quantity of water increases. In continuous, uniform filling of the housing, the level consequently rises ever more rapidly when the tapering area is reached and filled. By suitably locating a level sensor in the tapering area, a predefined quantity of water can therefore be resolved and detected very reliably. This makes it possible to determine a precise starting time for a water drainage process. Removing the water on the base plate through the drainage outlet leads initially to a rapid and then to a slowing fall in the level. The level falls slowest in the area of the base plate. It is advisable to set a time control for discontinuing the water drainage process such that a residual quantity of water still remains, which covers the drainage outlet. Due to the low rate at which the level moves in the vicinity of the base plate, a residual level remaining after drainage of the water can be adjusted very precisely by setting the time duration.

The gas connection of the water separator might have a fluid connection to a cathode outlet or an anode outlet of a fuel cell system. Equally, the gas connection might be connected to a gas recirculation line of the anode or cathode. The gas is under pressure and may be supersaturated with water vapour.

A single gas connection might be sufficient to achieve water separation. The water separator could then form the lowest point on an anode or cathode exhaust line or be arranged upstream of a recirculation line, so that water "falls" into the water separator. The exhaust or the recirculation lines could also in addition be cooled in order to increase the water vapour condensation/water separation. The gas connection could then have the largest possible cross section. It is also feasible, however, to provide a separate gas inlet and a separate gas outlet, which can be used for the introduction and removal of gas. In both cases the water separator provides a closed volume, in which an inflow or through-flow of gas can be stilled, whilst the water droplets contained therein are separated and can collect in the water separator.

The drainage outlet may be an opening in the base plate. At a point comprising the opening the base plate may have a depression, in which water can additionally collect, in order to cover the opening. A solenoid valve, which is opened during a water drainage process, may be arranged in the opening.

In the area of the base plate the housing could comprise a first portion, which extends with a substantially constant cross-sectional area in the direction of the gas connection. The first portion consequently forms a cylindrical or cuboidal volume having the largest possible cross-sectional area. The first portion extends over only a part of the overall height of the water separator. In this first portion a minimal rate of rise or fall in the level is to be expected. The first portion also preferably also comprises the area directly adjacent to the base plate or directly above the base plate, so that the drainage outlet always drains off water from this first portion.

In an advantageous embodiment the housing comprises a second portion between the base plate and the gas inlet, which is of substantially saddle, wedge, cone or inverted funnel-shaped formation. Here there is a taper, so that with a continuous volumetric flow of incoming water an increasing rate of rise or fall in the level is to be expected. In a particularly simple form, the lateral walls or wall/circumferential surfaces present in the second portion may follow a rectilinear course to the gas connection, so that they enclose a constant angle with the base plate. It is feasible, for example, for the base plate and the walls to enclose an angle of not more than 60°, in one embodiment an angle of not more than 45° and in another embodiment of not more than 25°.

The water separator could further comprise a flow-stilling element, which is arranged in the housing at a distance from the base plate and spans a local cross section of the housing. The flow-stilling element serves to still gas flows inside the housing in such a way that the water already present in the water separator is not flushed away from a spatial area surrounding the drainage outlet but remains there and prevents a gas flowing out of the drainage outlet. The flow-stilling element could extend, for example, over the entire cross section of the housing, so that all flows directed out of the gas connection towards the base plate can be reliably stilled.

The flow-stilling element could be a perforated plate or a porous foam or a honeycomb structure, which is arranged parallel to the base plate. The perforated plate is to be seen as a flat component which comprises multiple boreholes. The boreholes may be distributed in a regular pattern or irregularly over the perforated plate. This can be varied to suit the flow patterns of the incoming gas. The perforated plate could take the form of a sheet-metal plate or a plastic part.

The flow-stilling element could define the first portion. This serves to still the quantity of water received, particularly in the first portion, and to prevent heavy flows and the formation of a 2-phase mixture or 2-phase flow (gas and liquid) in an area surrounding the drainage outlet.

The water separator could further comprise multiple baffle plates, which are arranged transversely to the base plate and each comprise at least one through-flow opening or enclose at least one through-flow opening with the base plate. The baffle plates damp heavy swashing movements of the water in the water separator under movements of the water separator or of the aircraft into which such a water separator is incorporated. Although the through-flow openings allow the water to continue to flow inside the housing, it is hereby restricted in its dynamics It is feasible for the through-flow openings to be arranged all at the same height above the base plate, or at different heights. One particular solution is to arrange the through-flow openings as directly above the base plate as possible. They may take the form of individual boreholes or cut-outs, which are distributed along the base plate or the baffle plates. The baffle plates may take the form of sheet-metal plates or plastic parts. They may form an integral component with the perforated plate. A foam or a honeycomb structure could alternatively be used also for the baffle plates.

In a further advantageous embodiment, the water separator further comprises a level sensor for coupling to a drainage valve, the level sensor being arranged in a position on the housing where a local cross-sectional area is smaller than a cross-sectional area of the base plate. The cross-sectional area at the position where the level sensor is fitted may feasibly be half the cross-sectional area of the base plate or less. The level sensor could be arranged on a heavily tapered cross-sectional area, in order to reliably detect the desired maximum level. The level sensor could be embodied, in particular, as an ultrasonic level sensor.

The invention further relates to a fuel cell system, comprising at least one fuel cell and at least one water separator according to the preceding description. A cathode exhaust line or cathode gas recirculation line and also an anode exhaust line or anode gas recirculation line could have a fluid connection to the water separator. The water accumulating in the fuel cell process can then be collected and used for other purposes.

At least the one fuel cell could in particular be a PEM fuel cell. Such fuel cells are technically well developed and are capable of providing large electrical outputs at a moderate temperature level.

The invention further relates to a vehicle, comprising at least one such fuel cell system. The vehicle may, in particular, be an aircraft and preferably a passenger aircraft. The water separator may use the separated water for various purposes, so that it does not have to be carried separately.

The gas inlet is preferably arranged vertically or laterally above the level sensor and the housing tapers upwards. The water separator is consequently arranged directly below an exhaust gas source and allows water to be led off under the force of gravity.

The drainage outlet could be arranged at the lowest point on the water separator. This ensures that the drainage outlet always remains covered by water.

A drainage valve could have a fluid connection to the drainage outlet and be coupled to the aforementioned level sensor. The drainage valve could open on reaching the predefined maximum level.

BRIEF DESCRIPTION OF THE DRAWINGS

Further features, advantages and possible applications of the present invention emerge from the following description of the exemplary embodiments and the figures. Here, all the features described and/or graphically represented, both individually and in any combination, also form the subject matter of the invention irrespective of their compounding in the individual claims or their relation to one another. Furthermore, in the figures the same reference numerals denote identical or similar objects.

DETAILED DESCRIPTION

Figure 1:
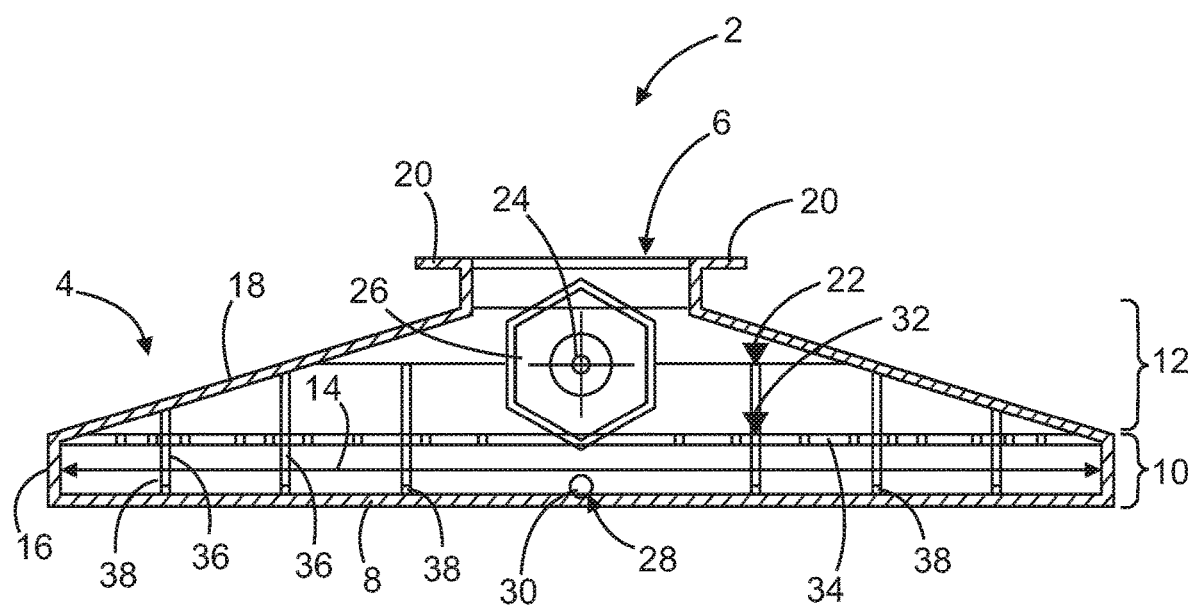
FIGS. 1 and 2 show a side view of a water separator.

FIG. 1 shows a side view of a water separator 2 for a fuel cell system. The water separator 2 may be of rotationally symmetrical design, so that the representation is to be regarded as a median section. Alternatively, however, the water separator 2 may also be formed by a non-circular body and be extended vertically to the drawing plane with a uniform cross section.

The water separator 2 comprises a closed housing 4 having a gas connection 6 and a base plate 8 arranged remotely from the gas connection 6. This forms a first portion 10 and a second portion 12 lying above the latter. In the first portion 10 an inside width 14, i.e. the width of the housing 4 in the interior of the housing 4, is constant and represents a maximum compared to the second portion 12.

In the second portion 12, which is situated between the first portion 10 and the gas connection 6, the inside width 14 diminishes continuously in the direction of the gas connection 6. In the exemplary embodiment shown the housing 4, for this purpose, in the first portion 10 comprises wall surfaces 16 which are arranged vertically in relation to the base plate 8. From the wall surfaces 16, inclined top surfaces 18 extend towards the gas connection 6. These enclose an angle of approximately 16°, for example, with the base plate 8 and extend along a straight line, for instance. The gas connection 6 is formed by a flange having projections 20, for example, to which a gas-ducting component can be bolted.

In the example, the base plate 8 has a width more than twice the height of the housing 4 from the base plate 8 to the outer end of the gas connection 6. In the exemplary embodiment shown the water separator 2 has a width more than four times the height. This accordingly results in an extremely shallow construction. Due to the tapering shape of the housing 4 from the base plate 8 towards the gas connection 6, the water level in the first portion 10 at first rises uniformly, whilst in the second portion 12 its rate of rise increases with the increasing level. A level sensor 24 is arranged at a predetermined maximum level 22, which clearly in the second portion 12 may lie at somewhat more than half the height of the second portion 12. This sensor may be an ultrasonic sensor and is screwed into the housing 4, for example, by way of a hexagonal bolt 26. As soon as the water level reaches the predetermined maximum level 22, the level sensor 24 generates a signal. This can be used to open a valve, in order to drain water out of the housing 4. A drainage outlet 28, which is closed by a solenoid valve 30, is furthermore provided in the base plate 8. To open the drainage outlet 28 the solenoid valve 30 is opened, which can be initiated, for example, by a signal from the level sensor 24.

In order to prevent gas which gets into the interior of the housing 4 escaping from the water separator 2 via the drainage outlet 28, a minimum level 32 of water in the housing 4 is desirable. This level lies, for example, approximately at a transition between the first portion 10 and the second portion 12. There, a flow-stilling element 34 in the form of a perforated plate is furthermore arranged. This may also be an extensive porous foam, for example. Alternatively, a honeycomb structure is also feasible. The flow-stilling element 34 runs parallel to the base plate 8 and is capable of counteracting strong or marked flow phenomena. The flow can thereby be stilled, particularly at the drainage outlet 28, which helps prevent gas escaping from the drainage outlet 28.

Multiple baffle plates 36 having through-flow openings 38, which extend substantially from the base plate 8 in the direction of the gas connection 6, are furthermore provided transversely to the base plate 8. They terminate at the height of the maximum level 22, for example. In the event of strong lateral movements of the water separator 2, swashing movements of the received water can be prevented or reduced. This can also serve to still the flow in the area of the drainage outlet 28, so that an escape of gases can be prevented.

Figure 2:
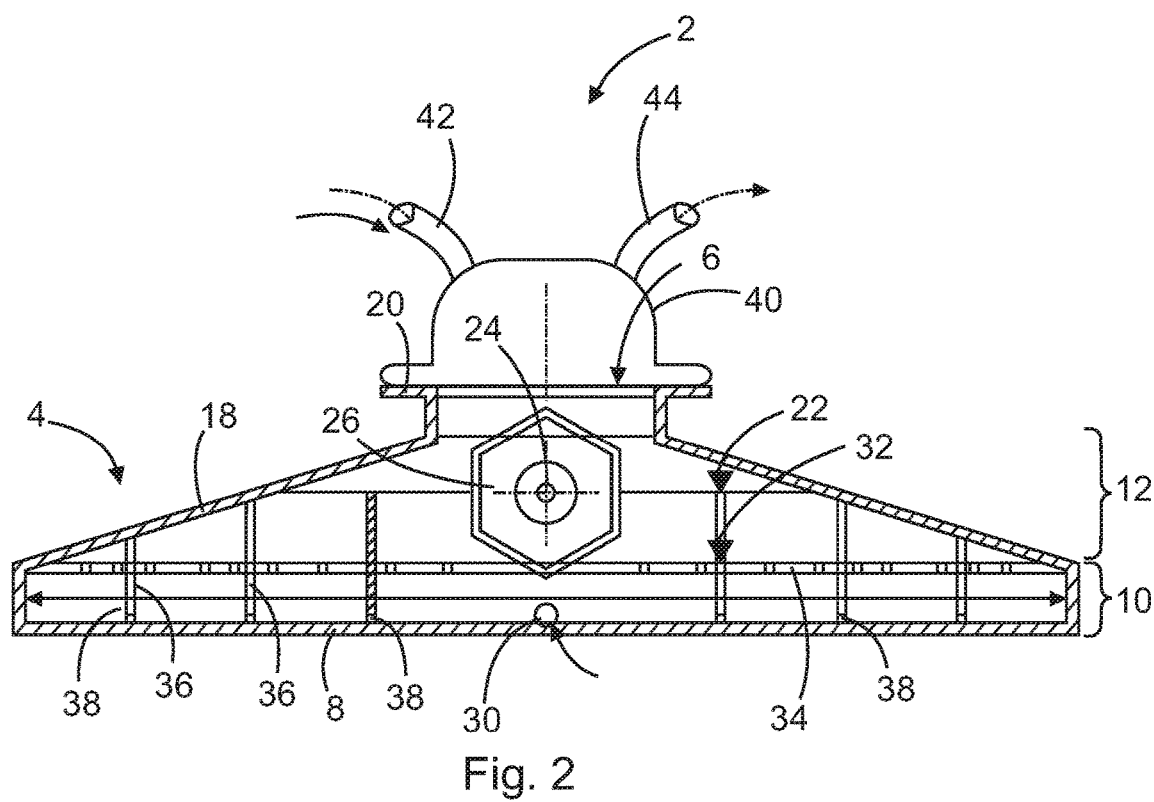

FIG. 2 shows substantially the same exemplary embodiment of the water separator 2. Here a type of cover 40, which comprises a gas inlet 42 and a gas outlet 44, is arranged on the flange 20. Gas flowing into the water separator 2 via the gas inlet 42 is able to release water and leave the water separator 2 again through the gas outlet 44.

Figure 3:
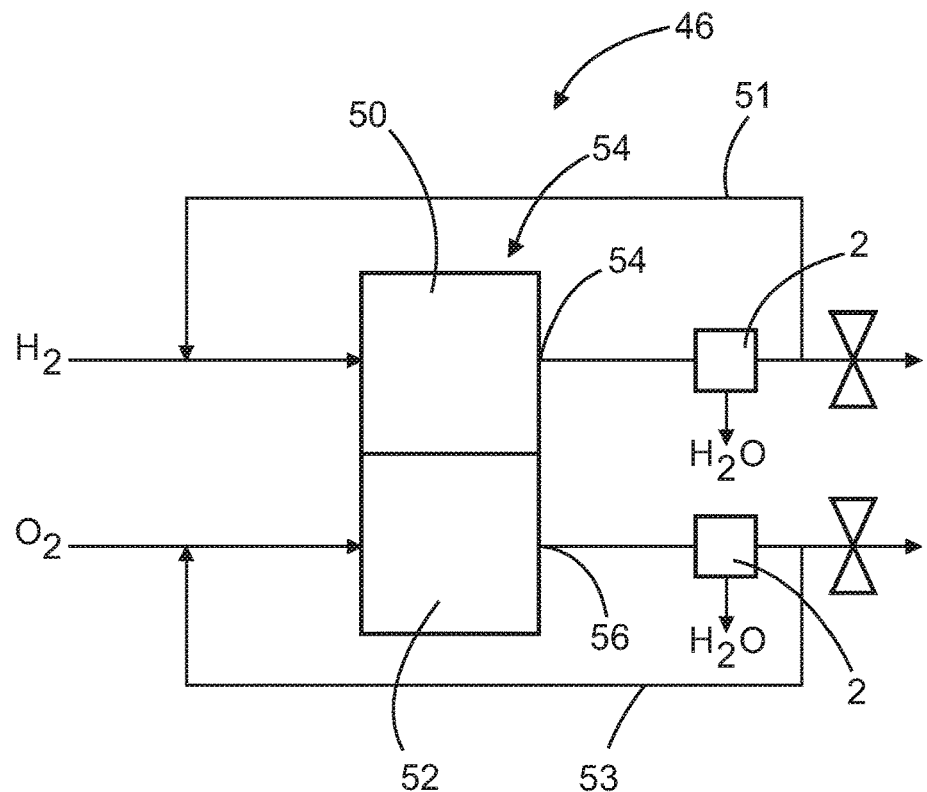
FIG. 3 shows a fuel cell system having such a water separator for operation with hydrogen and oxygen.

FIG. 3 shows a fuel cell system 46 having a fuel cell 48, which comprises an anode 50 and a cathode 52. Hydrogen is delivered to the anode 50, oxygen to the cathode 52. A water separator 2 is connected to both the anode 50 and the cathode 52 on the downstream side. Both water separators 2 have a fluid connection to an outlet 54 and 56 of the anode and the cathode respectively and are each capable of releasing water. A recirculation line 51 and 53 is connected to the outlet side of both the anode 50 and the cathode 52. The water separators 2 are connected to the respective recirculation lines 51 and 53 on the upstream side.

Figure 4:
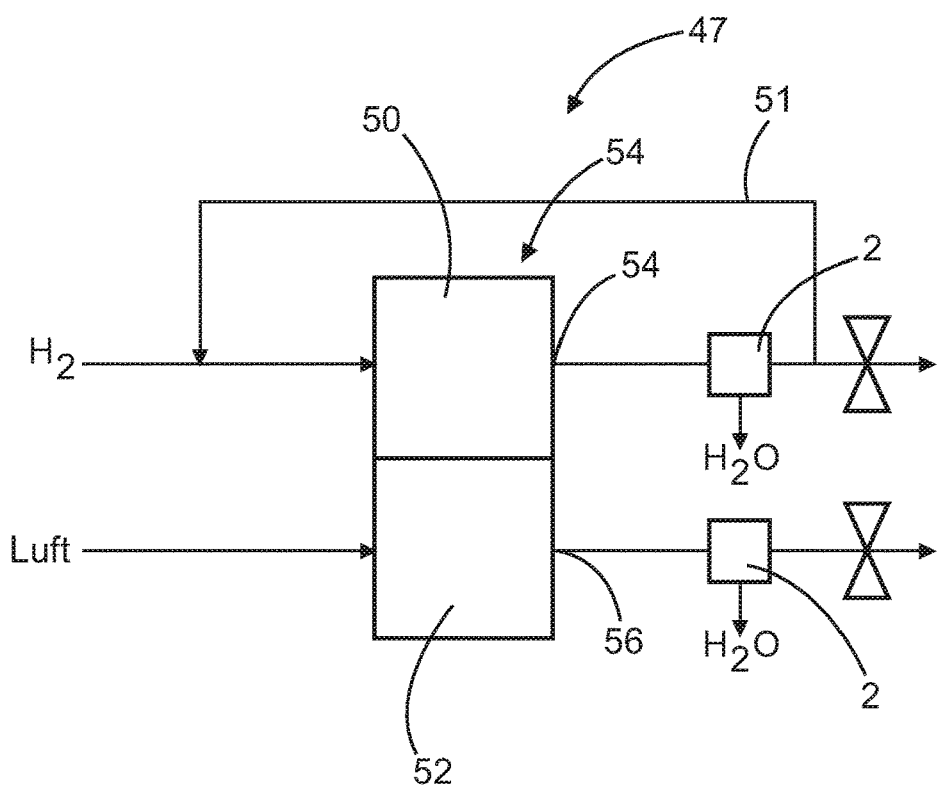
FIG. 4 shows a further fuel cell system having such a water separator for operation with hydrogen and air.

FIG. 4 shows a fuel cell system 47, which likewise comprises a fuel cell 48. A water separator 2 is in each case connected to the anode 50 and the cathode 52 on the outlet side. The difference compared to the fuel cell system 46 in FIG. 3 is that the cathode 52 is supplied with air. There is therefore no recirculation line 53.

Figure 5:
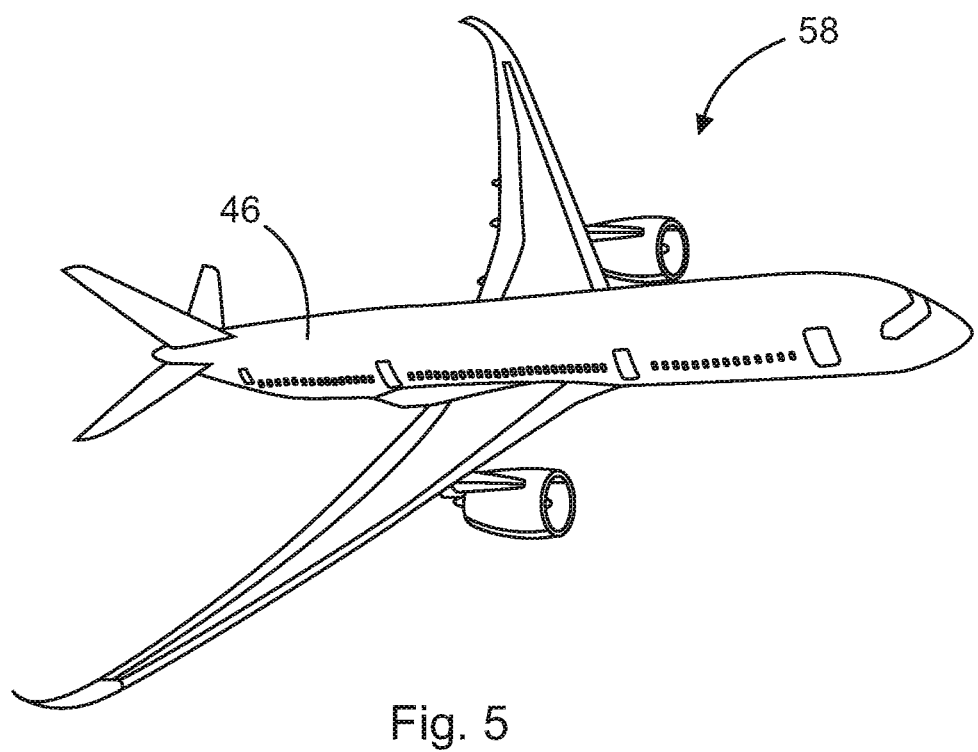
FIG. 5 shows an aircraft, which comprises a fuel cell system having such a water separator.

Finally, FIG. 5 shows an aircraft 58, in which such a fuel cell system 46 can be installed.

It should further be pointed out that the term "comprising" does not preclude other elements or steps, and "a" does not exclude a plurality. Furthermore, it should be pointed out that features which have been described by reference to one of the exemplary embodiments above can also be used in combination with other features of other exemplary embodiments described above. Reference numerals in the claims are not to be regarded as being restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 water separator
4 housing
6 gas connection
8 base plate
10 first portion
12 second portion
14 inside width
16 wall surface
18 top surface
20 projection
22 maximum level
24 level sensor
26 bolt
28 drainage outlet
30 valve, solenoid valve
32 minimum level
34 flow-stilling element
36 baffle plate
38 through-flow opening
40 cover
42 gas inlet
44 gas outlet
46 fuel cell system
47 fuel cell system 48 fuel cell
50 anode
51 recirculation line
52 cathode
53 recirculation line
54 outlet
56 outlet
58 aircraft/vehicle

The invention claimed is:

1. A water separator for a fuel cell system, comprising:
a housing with a gas connection and a base plate arranged remotely from the gas connection and having a drainage outlet, an inside width of the housing at least in portions decreasing from the base plate towards the gas connection, and the height of the housing less than the greatest inside width of the housing at the base plate.

2. The water separator according to claim 1, the housing in the area of the base plate comprising a first portion extending with a constant cross-sectional area towards the gas connection.

3. The water separator according to claim 1, wherein the housing between the base plate and the gas connection comprises a second portion, which is of a saddle, wedge, cone or inverted funnel-shaped formation.

4. The water separator according to claim 1, further comprising a flow-stilling element arranged in the housing at a distance from the base plate and spanning a local cross section of the housing.

5. The water separator according to claim 4, wherein the flow-stilling element is a perforated plate, a porous foam or a honeycomb structure, arranged parallel to the base plate.

6. The water separator according to claim 2, further comprising a flow-stilling element arranged in the housing at a distance from the base plate and spanning a local cross section of the housing,
wherein the flow-stilling element defines the first portion.

7. A water separator for a fuel cell system, comprising:
a housing with a gas connection and a base plate arranged remotely from the gas connection and having a drainage outlet, an inside width of the housing at least in portions decreasing from the base plate towards the gas connection, and the height of the housing less than the greatest inside width of the housing, and
multiple baffle plates arranged transversely to the base plate and each comprising at least one through-flow opening or enclose at least one through-flow opening with the base plate.

8. A water separator for a fuel cell system, comprising:
a housing with a gas connection and a base plate arranged remotely from the gas connection and having a drainage outlet, an inside width of the housing at least in portions decreasing from the base plate towards the gas connection, and the height of the housing less than the greatest inside width of the housing, and
a level sensor for coupling to a valve, wherein the level sensor is arranged in a position on the housing where a local cross-sectional area is smaller than a cross-sectional area of the base plate.

9. A fuel cell system, comprising at least one fuel cell and at least one water separator according to claim 1.

10. The fuel cell system according to claim 9, wherein at least one of the at least one fuel cell is a PEM fuel cell.

11. A vehicle, comprising at least one fuel cell system according to claim 9.

12. The vehicle according to claim 11, wherein the gas connection is arranged vertically or laterally above the level sensor, and the housing tapers upwards.

13. The vehicle according to claim 11, wherein the drainage outlet is arranged at the lowest point of the water separator.

14. The vehicle according to claims 11, further comprising a drainage valve having a fluid connection to the drainage outlet.

15. The water separator according to claim 7, the housing in the area of the base plate comprising a first portion extending with a constant cross-sectional area towards the gas connection.

16. The water separator according to claim 7, wherein the housing between the base plate and the gas connection comprises a second portion, which is of a saddle, wedge, cone or inverted funnel-shaped formation.

17. The water separator according to claim 15, further comprising a flow-stilling element arranged in the housing at a distance from the base plate and spanning a local cross section of the housing,
wherein the flow-stilling element defines the first portion.

18. The water separator according to claim 8, the housing in the area of the base plate comprising a first portion extending with a constant cross-sectional area towards the gas connection.

19. The water separator according to claim 8, wherein the housing between the base plate and the gas connection comprises a second portion, which is of a saddle, wedge, cone or inverted funnel-shaped formation.

20. The water separator according to claim 18, further comprising a flow-stilling element arranged in the housing at a distance from the base plate and spanning a local cross section of the housing,
wherein the flow-stilling element defines the first portion.

* * * * *